A. J. SCHULTZ.
BATTER PITCHER.
APPLICATION FILED APR. 25, 1921.
1,422,382.
Patented July 11, 1922.
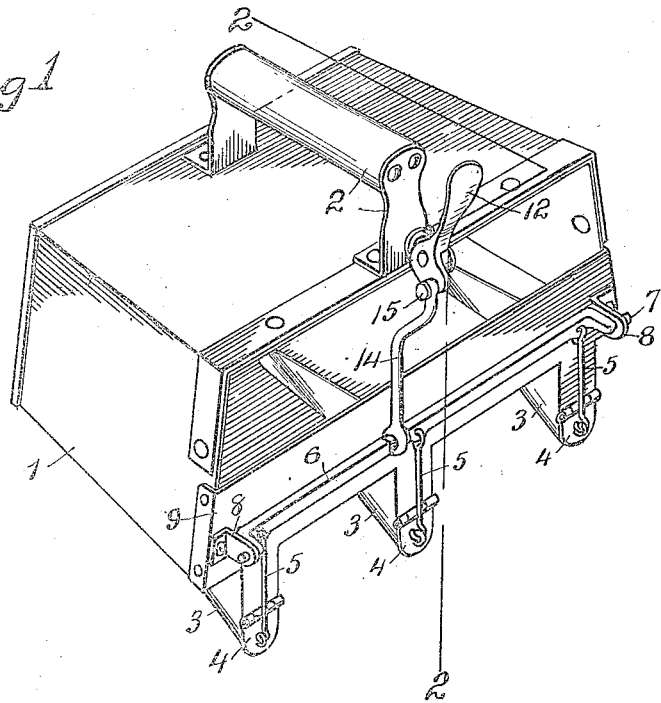
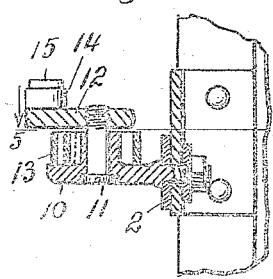
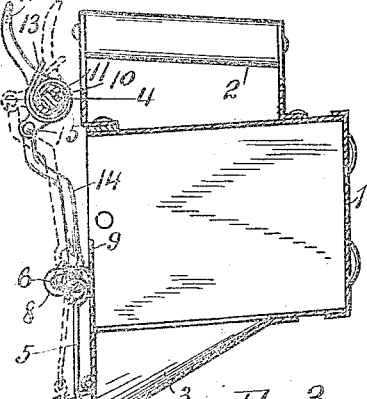
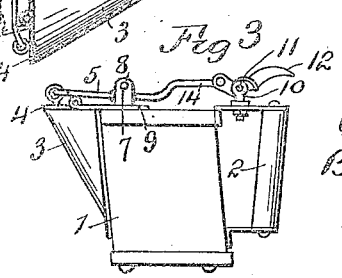
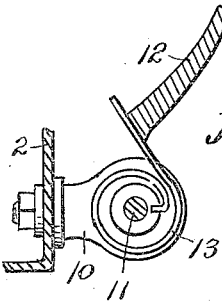
Witness:
R. L. Hamilton
Inventor,
Adolf J. Schultz,
By Warren D. House
His Attorney.

UNITED STATES PATENT OFFICE.

ADOLF J. SCHULTZ, OF KANSAS CITY, MISSOURI.

BATTER PITCHER.

1,422,382.  Specification of Letters Patent.  Patented July 11, 1922.

Application filed April 25, 1921. Serial No. 464,174.

*To all whom it may concern:*

Be it known that I, ADOLF J. SCHULTZ, a citizen of the United States, residing at Kansas City, in the county of Jackson and State of Missouri, have invented a certain new and useful Improvement in Batter Pitchers, of which the following is a specification.

My invention relates to improvements in batter pitchers.

The object of my invention is to provide a batter pitcher with which a plurality of cakes of like sizes may be simultaneously poured.

A further object of my invention is to provide a batter pitcher of the kind described which is simple, cheap to make, durable, not liable to get out of order, and which may be easily operated with one hand.

The novel features of my invention are hereinafter fully described and claimed.

In the accompanying drawing, which illustrates the preferred embodiment of my invention, Fig. 1 is a perspective view of my improved batter pitcher, shown tilted to the discharge position with the closures or spouts closed.

Fig. 2 is a vertical sectional view of the same on the line 2—2 of Fig. 1.

Fig. 3 is a side elevation of the pitcher, reduced.

Fig. 4 is an enlarged cross section on the line 4—4 of Fig. 2.

Fig. 5 is a cross section on the line 5—5 of Fig. 4.

Similar reference characters designate similar parts in the different views.

1 designates the body, preferably substantially rectangular having attached to one side a handle 2, and provided at the opposite side with a plurality of delivery spouts 3, the discharge ends of which are preferably located in the same horizontal and vertical planes. The discharge end of each spout 3 has hinged thereto a closure 4, which is pivotally connected to one end of a wire 5, the other end of which is pivoted to a crank portion 6, of a rock shaft 7, which is oscillatable in bearings 8, mounted on a cover plate 9 secured to the top of the body 1 and which closes the front portion of the upper end of the body.

Mounted on the upper portion of the handle 2, is a bearing member 10, through which extends a horizontal oscillatable screw 11, to which is secured a thumb operated lever 12, located so as to be swung in one direction by the thumb of a hand grasping the handle 2. For swinging the lever 12 in the opposite direction, there is provided a volute spring 13, the inner end of which is rigidly secured to the member 10 and the other end of which bears against the lever 12. A connecting rod 14 is pivoted at one end to the crank 6, and its other end is pivoted to a pin 15 which extends laterally from the lever 12.

The upper end of the body 1 at the rear of the plate 9 may be left open to permit access to the interior of the pitcher.

In the operation of the invention, the spring 13 normally holds the closures 4 closed. When it is desired to pour batter to form cakes, the body is tilted so as to permit the batter to run into the spout 3. The thumb of the hand which is grasping the handle 2 is then used to swing the lever 12 so as to simultaneously open the closures 4, upon which batter in equal amounts will flow from the spouts 3 to form the corresponding number of cakes on the griddle. When sufficient batter has been deposited to form cakes of the size desired, the pressure on the lever 12 by the thumb is released, thereby permitting the spring 13 to close the closures 4 through the intermediacy of the lever 12, rod 14, crank 6 and wires 5, thereby shutting off outward flow of batter.

By having a flat side on the side of the body having the discharge spouts, and by providing the spouts with discharge opening of like size, and the discharge ends of the spouts located in the same vertical and horizontal planes, an equal amount of batter will be discharged from the different spouts, thus making a batch of cakes of like size.

It will be noted that the spouts 3 are located at the upper end and at one side of the receptacle. By so locating the spouts, there can be no leakage therefrom when the receptacle is left standing on its bottom, and there is no liability of the spouts getting dirt from the support on which the receptacle stands, or of batter therefrom soiling the support.

I do not limit my invention to the structure shown and described, as many modifications, within the scope of the appended claims may be made without departing from the spirit of my invention.

What I claim is.

1. In a batter pitcher comprising a receptacle having a handle, a plurality of delivery spouts located at the upper end of said receptacle, and closures for said spouts, and means for simultaneously opening and closing said closures, substantially as set forth.

2. A batter pitcher comprising a receptacle having a handle, a plurality of delivery spouts located at the upper end of said receptacle, and closures for said spouts, a rock shaft oscillatable on said receptacle, means actuated by the rock shaft for moving said closures to and from the closed position, when the rock shaft is oscillated, and means for oscillating the rock shaft, substantially as set forth.

3. A batter pitcher comprising a receptacle having at one side a handle and provided at its opposite side with a plurality of delivery spouts the discharge ends of which are located in the same vertical and horizontal plane at the upper end of said receptacle, closures for said spouts, and means for simultaneously moving said closures to and from the closed position, substantially as set forth.

4. A batter pitcher comprising a receptacle having a handle, a plurality of discharge spouts and hinged closures for said spouts, a rock shaft mounted on said receptacle and having a crank, members respectively pivoted to said closures and pivoted to said crank, a lever located so as to be swung by a hand grasping the handle, a spring for swinging the lever in one direction, and a member connecting the lever and said crank by which the lever oscillates the said crank, substantially as set forth.

5. A batter pitcher comprising a receptacle having at one side a handle and provided at its opposite side and upper end with a plurality of delivery spouts, and hinged closures for said spouts, a rock shaft oscillatably mounted on the upper end of said receptacle and having a crank, connecting wires pivoted to said crank and respectively pivoted to said closures, a lever, a spring for forcing the lever in one direction, and a connecting rod connecting said crank and said lever, substantially as set forth.

In testimony whereof I have signed my name to this specification.

ADOLF J. SCHULTZ.